United States Patent
Kumar

(10) Patent No.: US 10,412,320 B1
(45) Date of Patent: Sep. 10, 2019

(54) METHOD AND SYSTEM FOR SWITCHING DISPLAY FROM FIRST VIDEO SOURCE TO SECOND VIDEO SOURCE

(71) Applicant: Wipro Limited, Bangalore (IN)

(72) Inventor: Kodavalla Vijay Kumar, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/940,202

(22) Filed: Mar. 29, 2018

(30) Foreign Application Priority Data

Mar. 29, 2018 (IN) .............................. 201841011862

(51) Int. Cl.
*H04N 5/268* (2006.01)
*H04N 5/262* (2006.01)

(52) U.S. Cl.
CPC .................................. *H04N 5/268* (2013.01)

(58) Field of Classification Search
CPC ...................................................... H04N 5/268
See application file for complete search history.

(56) References Cited

U.S. PATENT DOCUMENTS

| 4,994,916 A | * | 2/1991 | Pshtissky | ......... | G08B 13/19634 |
| | | | | | 348/159 |
| 2011/0298814 A1 | | 12/2011 | Mathew et al. | | |
| 2014/0016638 A1 | * | 1/2014 | Chen | .................... | H04L 12/185 |
| | | | | | 370/390 |

* cited by examiner

*Primary Examiner* — Jefferey F Harold
*Assistant Examiner* — Justin B Sanders
(74) *Attorney, Agent, or Firm* — Pepper Hamilton LLP

(57) ABSTRACT

Embodiments of the present disclosure relates to a method and a system for switching display from a first video source to a second video source. The system receives a source switch indication request for switching the display from the first video source to the second video source identified by source identification of the second video source. Further the system synchronizes the source switch indication request using frame sync of the first video source and the second video sources and mask the interface signals of the first video source to generate output interface signals corresponding to the second video source. The display is then driven by the output interface signals of the second video source thereby enabling seamless switching of the display without using frame buffer, thereby rendering the video stream from multiple video sources without any tearing artifacts or display glitches and still optimizing the switching latency.

12 Claims, 5 Drawing Sheets

METHOD AND SYSTEM FOR SWITCHING DISPLAY FROM FIRST VIDEO SOURCE TO SECOND VIDEO SOURCE

This application claims the benefit of Indian Patent Application Serial No. 201841011862 filed Mar. 29, 2018, which is hereby incorporated by reference in its entirety.

FIELD

The present subject matter is related, in general to display systems, and more particularly, but not exclusively to a method and system for switching display from first video source to a second video source.

BACKGROUND

Video synchronization on a real-time basis across multiple sources including synchronous and asynchronous sources is needed for application scenarios that require fast and flicker free switching among such sources. Unfortunately, video streams from different sources are not necessarily synchronized with each other as synchronization process is itself time consuming. As a result, a process of switching between sources cause user-visible display glitches.

Conventional switching systems enable switching of display from various synchronous or asynchronous sources by storing incoming frames from various sources in frame buffer memory before the switching, to avoid any visual disturbance. However, the switching requires a large frame buffer in the system to store the incoming frames. In addition, the frames read from such frame buffer are retimed before being displayed, therefore involving higher switching latencies as frames need to be stored, retrieved, and retimed. If there is no frame storage before switching, there will be visual disturbance or tearing artifacts seen, if switched directly. Moreover, some of the conventional switching systems may not even have the frame buffer memory. Adding the frame buffer memory significantly increases bill of materials (BOM) cost, power consumption and system real estate. Even if the frame buffer memory already exists in system, the storage and retrieve functions, before switching sources, consumes huge memory space and memory bandwidth, which is normally scarce.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of switching display from a first video source to a second video source. The method includes, receiving one or more interface signals from a plurality of video sources that includes at least the first video source and the second video source. One or more interface signals comprise at least one of frame sync, line sync, clock, data enable and data. The method further includes receiving one or more user inputs including at least a source switch indication and new source identification (ID) associated with the second video source. In an aspect, the source switch indication includes a request for switching the display from the first video source to the second video source. The method further includes synchronizing the source switch indication and the new source ID with frame sync of the first video source to generate a first delayed source switch indication and first delayed new source ID. Furthermore, the method includes synchronizing the first delayed source switch indication and the first delayed new source ID with frame sync of the second video source to generate a second delayed source switch indication and second delayed new source ID. Also, the method includes masking of the one or more interface signals of the first video source based on the first delayed source switch indication and generating one or more output interface signals for switching the display from the first video source to the second video source based on the second delayed source switch indication and the second delayed new source ID.

Further, the present disclosure relates to a video switching processing system for switching display from a first video source to a second video source. The system includes a multilayer synchronization and mask unit (MSMU) and a switching unit coupled with the MSMU. The MSMU is configured to receive one or more interface signals from the first video source and the second video source, where the one or more interface signals include at least one of frame sync, line sync, clock, data enable and data. The MSMU includes at least a first delay unit, a second delay unit, and a sync mask unit coupled with the first delay unit and the second delay unit. The first delay unit is configured to receive frame sync from a plurality of video sources that includes at least the first video source and the second video source. The first delay unit is further configured to receive one or more user inputs including at least a source switch indication and new source identification (ID) associated with the second video source, where the source switch indication includes a request for switching the display from the first video source to the second video source. Upon receiving the user inputs, the first delay unit synchronizes the source switch indication and the new source ID with frame sync of the first video source to generate a first delayed source switch indication and first delayed new source ID. The second delay unit is configured to synchronize the first delayed source switch indication and the first delayed new source ID with frame sync of the second video source to generate a second delayed source switch indication and second delayed new source ID. Further, the sync mask unit is configured to mask the one or more interface signals of the first video source using the first delayed source switch indication. The switching unit is configured to generate one or more output interface signals for switching the display from the first video source to the second video source based on the second delayed source switch indication and the second delayed new source ID.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the leftmost digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
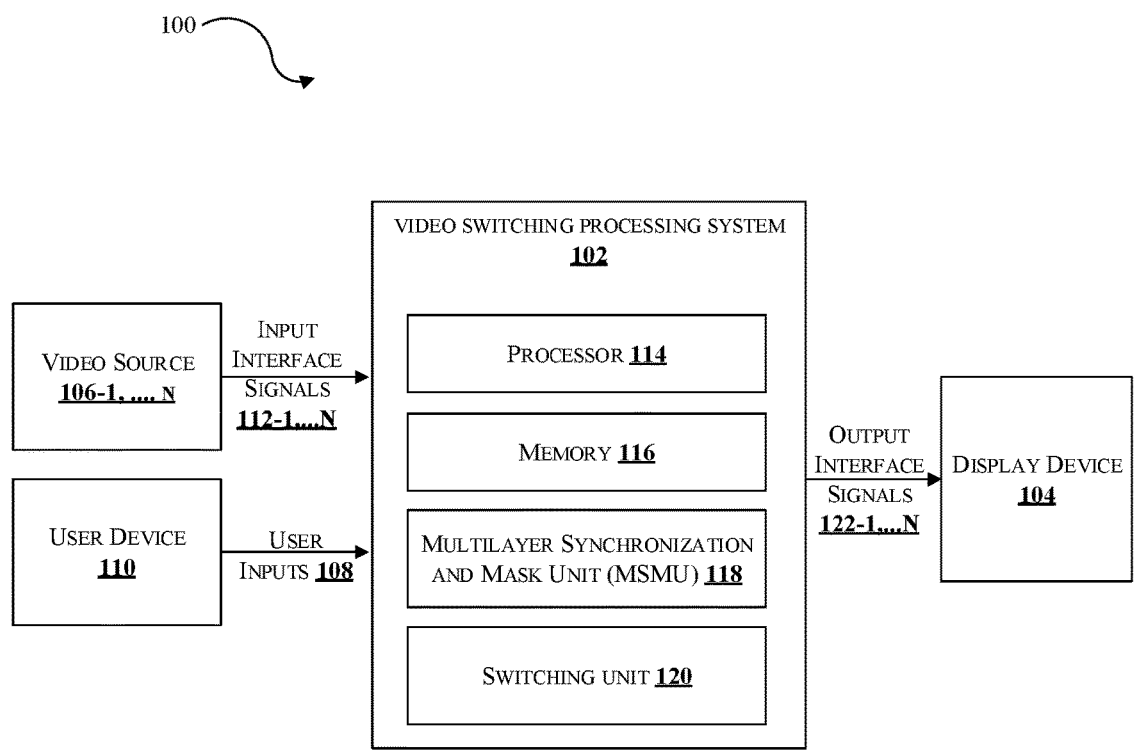
FIG. 1 shows an architecture diagram illustrating an exemplary system for enabling switching of display from first video source to second video source in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "include(s)", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for switching display from a first video source to a second video source. The system receives a source switch indication request for switching the display from the first video source to the second video source identified by source identification of the second video source. Further the system synchronizes the source switch indication request using frame sync of the first video source and the second video sources and mask the interface signals of the first video source to generate output interface signals corresponding to the second video source. The display is then driven by the output interface signals of the second video source thereby enabling seamless switching of the display without using frame buffer, thereby rendering the video stream from multiple video sources without any tearing artifacts or display glitches and still optimizing the switching latency.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an architecture diagram illustrating an exemplary system 100 for enabling switching of display from first video source to second video source in accordance with some embodiments of the present disclosure.

As shown in FIG. 1, the exemplary system 100 includes one or more components configured for switching display among multiple video sources. In one embodiment, the exemplary system 100 includes a video switching processing system (hereinafter referred to as VSPS) 102 that enables switching of the display device 104 between multiple video sources 106-1, . . . N, wherein N indicates number of video sources (hereinafter collectively referred to as video sources 106) in response to user inputs 108. The user inputs 108, may be for example include at least a source switch indication and new source identification (ID). The source switch indication includes a user request for switching the display device 104 to the video sources 106 identified by the new source ID. In an embodiment, each video source is identified by a source ID and each source ID will be represented in 'N' bits when there are '2N' sources. In one embodiment, the user inputs 108 may be received via a user device 110.

The user device 110 may be a portable electronic device such as a mobile phone, a gaming device, a music player, a notebook computer, or a personal digital assistant, for example. In addition, as is known in the art, the user device 110 can include multiple features or applications such as a camera, a music player, or an Internet browser. In another example, the user device 110 may be a game player used to playing video games that require the user to quickly react to changes in display output.

The video sources 106 may be graphic sources that include synchronous (in sync) and asynchronous sources (out of sync) including different graphical processing units (GPU) or different plane within a GPU or image sensors. The video sources 106 transmits one or more input interface signals 112-1, . . . N (hereinafter collectively referred to as input interface signals 112) to the VSPS 102 to enable the switching of the display device 104, for example from a first video source to a second video source. The input interface signals 112 may include at least one of vertical sync (interchangeably referred as Vsync or frame sync), horizontal sync (interchangeably referred as Hsync or line sync), clock, data enable, and data associated with the video sources 106 that may drive the display device 104. The display device (interchangeably referred to as display) 104 may comprise a display panel (not shown), and a display driver or controller (not shown) that receives the input interface signals 112 of the video sources 106 including, for example, first and the second video sources and generate one or more output interface signals 122-1, . . . N (hereinafter collectively referred to as output interface signals 122) to drive the display panel in rendering an output video stream of the video sources 106. The display device 104 may also comprise a two-dimensional (2D) or three-dimensional (3D) display module (not shown) that enable rendering of video stream in required format upon switching the video sources 106.

The VSPS 102 includes one or more components to enable the switching of the display device 104 from the first video source to the second video source. In one embodiment, the VSPS 102 includes at least a processor 114, a memory 116, a Multilayer Synchronization and Mask Unit (MSMU) 118 and a switching unit 120 coupled with the MSMU 118. The MSMU 118 synchronizes the user inputs 108 using the input interface signals 112 and masks the input interface signals of the first video source to enable the switching operation. The MSMU 118 is further explained in detail in conjunction with FIG. 2A. Upon synchronization and masking, the switching unit 120 generates the output interface signals 122 corresponding to the input interface signals of the second video source for driving the display device 104. In one embodiment, the switching unit 120 includes at least one multiplexer that enables selection of the input interface signals of the second video source as the output interface signals 122 for driving the display device 104 to render the video stream of the second video source.

The system 100 may also include pre-processing and post-processing circuitry (not shown) to perform various graphics processing operations for enabling switching of the display device 104.

Figure 2A:
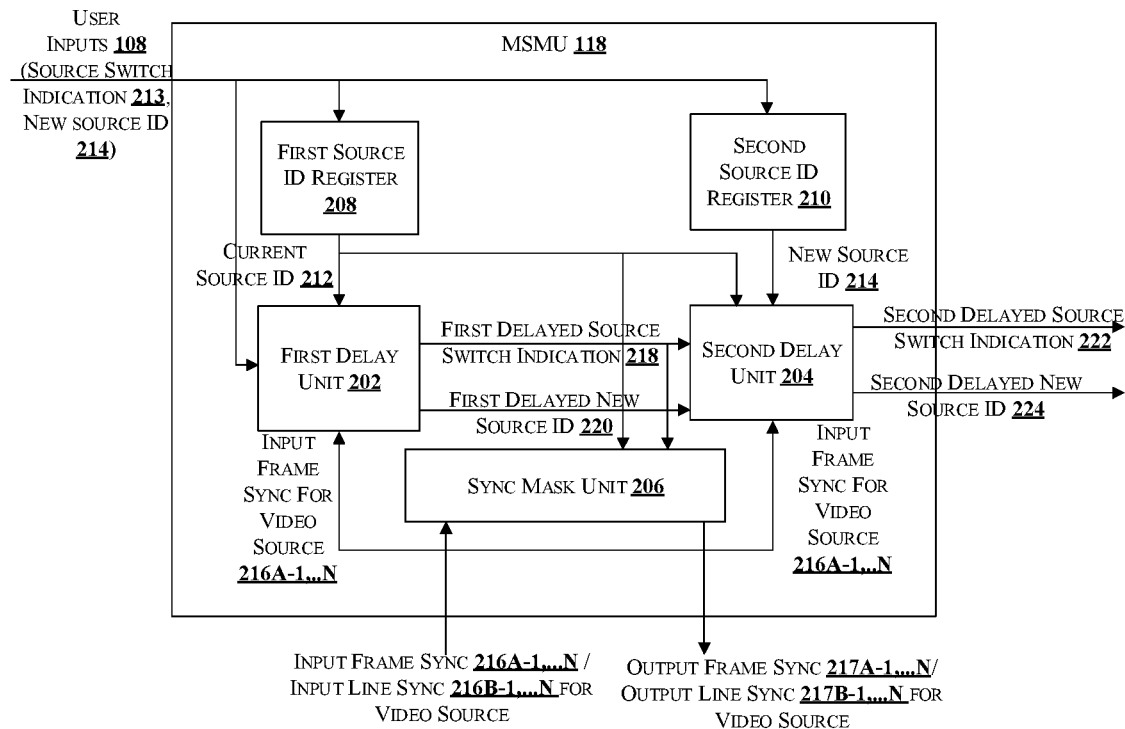
FIG. 2A is an exemplary block diagram of Multilayer Synchronization and Mask Unit (MSMU) of a video switching processing system (VSPS) of FIG. 1 in accordance with some embodiments of the present disclosure.

As illustrated in FIG. 2A, the MSMU 118 includes at least a first delay unit 202, a second delay unit 204 and a sync mask unit 206 coupled with the first delay unit 202 and the second delay unit 204. The MSMU 118 also includes at least a first source identification (ID) register 208 coupled to the first delay unit 202 and a second source ID register 210 coupled to the second delay unit 204. The first source ID register 208 and the second source ID register 210 may be typical registers for storing information associated with the first and the second delay units 202, 204 respectively. In one embodiment, the first source ID register 208 stores a current source ID 212 identifying the originating video source i.e., the first video source that provides current video stream that is being rendered via the display device 104 before the switching operation. The second source ID register 210 stores a new source ID 214 identifying the destination video source i.e., the second video source that provides a new video stream that will be rendered via the display device 104 after the switching operation is completed.

Figure 2B:
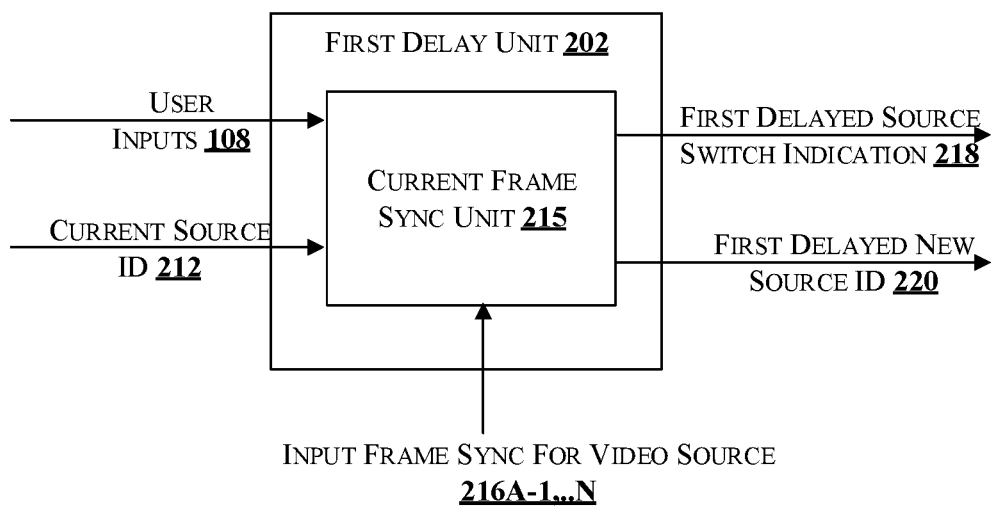
FIGS. 2B, 2C and 2D respectively illustrate an exemplary block diagram of first delay unit, second delay unit and sync mask unit of MSMU of FIG. 2A in accordance with some embodiments of the present disclosure.

The MSMU 118 receives the user inputs 108 and input frame sync 216A-1, . . . N/input line sync 216B-1, . . . N for the video sources 106, performs synchronization of the received user inputs 108 and masking of the input frame sync 216A-1, . . . N/input line sync 216B-1, . . . N to generate output frame sync 217A-1, . . . N/output line sync 217B-1, . . . N that may be used for switching the display device 104 in rendering the output video stream of the video sources 106. In one embodiment, the first delay unit 202 receives the user inputs 108 and the input frame sync 216A-1, . . . N for synchronization of the received user inputs 108. The first delay unit 202 is further explained in detail in conjunction with FIG. 2B. As illustrated in FIG. 2B, the first delay unit 202 includes a current frame sync unit 215 capable of receiving the input frame sync 216A-1, . . . N (collectively referred to as input frame sync 216A) of the video sources 106, for example the first video source and the second video source and synchronizing the user inputs 108 based on the received input frame sync 216A and the current source ID 212 to generate a first synchronized signal. In one embodiment, the current frame sync unit 215 receives the user inputs 108 including the source switch indication 213 and the new source ID 214 from the user via the user device 110 and stores the new source ID 214 in the second source ID register 210.

The current frame sync unit 215 receives frame sync of the first video source and determines a next frame sync of the first video source using the current source ID 212 retrieved from the first source ID register 208. Upon determination, the current frame sync unit 215 delays the source switch indication 213 and the new source ID 214 till start of the next frame sync of the first video source, thereby generating the first synchronized signal, including at least a first delayed source switch indication 218 and a first delayed new source ID 220. The first synchronized signal may be a frame level adaptive synchronized signal, in one embodiment.

To create window for dynamic switching without any visual disturbance or tearing artifacts, the first synchronized signal is further synchronized to generate a second synchronized signal that includes at least a second delayed source switch indication 222 and a second delayed new source ID 224. In one embodiment, the second delay unit 204 is configured to further synchronize the first delayed source switch indication 218 and generate the second delayed source switch indication 222 thereby minimizing the flicker or tearing artifacts during the switching of the first video source to the second video source. The second delay unit 204 is further explained in detail in conjunction with FIG. 2C.

Figure 2C:
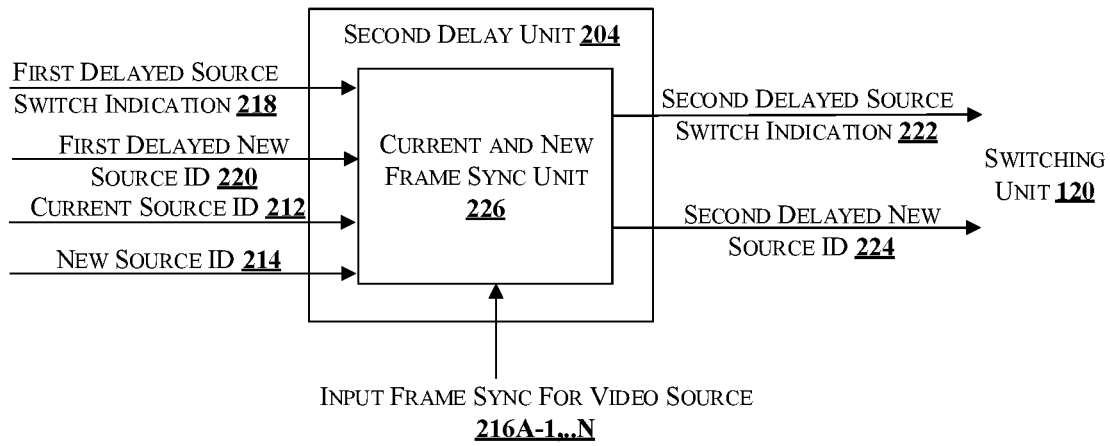

As illustrated in FIG. 2C, the second delay unit 204 includes a current and new frame sync unit 226 capable of synchronizing the first synchronized signal with the frame sync of the second video source and generating the second delayed source switch indication 222. In one embodiment, the current and new frame sync unit 226 determines a next-to-next frame sync using the current source ID 212 retrieved from the first source ID register 208. Further, the current and new frame sync unit 226 determines a next frame sync of the second video source using the new source ID 214. Upon determination, the current and new frame sync unit 226 delays the first delayed source switch indication 218 and the first delayed new source ID 220 till start of the next frame sync of the second video source occurring either at or after the next-to-next frame sync of the first video source, thereby generating the second synchronized signal, including at least the second delayed source switch indication 222 and the second delayed new source ID 224. The second synchronized signal may be a frame level adaptive synchronized signal, in one embodiment. Upon synchronization, the sync mask unit 206 blocks the input frame sync and line sync of the first video source using the first delayed source switch indication 218. The sync mask unit 206 is further explained in detail in conjunction with FIG. 2D.

Figure 2D:
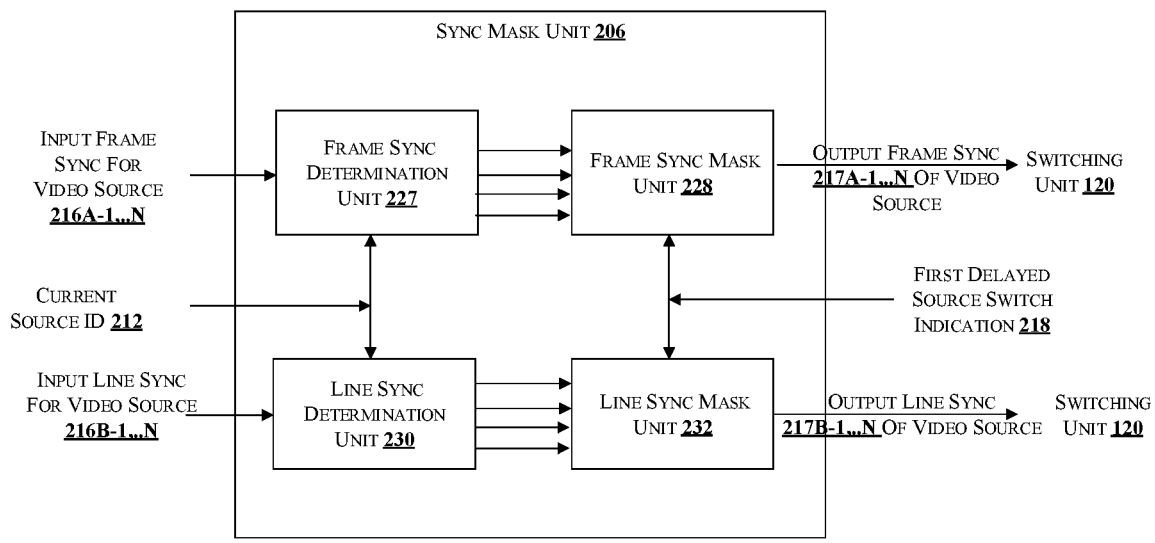

As illustrated in FIG. 2D, the sync mask unit 206 includes at least a frame sync determination unit 227, a frame sync mask unit 228, a line sync determination unit 230 and a line sync mask unit 232 coupled with each other. The frame sync determination unit 227 receives the input frame sync 216A of the video sources 106 and determines the next-to-next frame sync of the first video source among the received input frame sync 216A of the video sources 106 using the current source ID 212. The frame sync mask unit 228 blocks the frame sync of the first video source starting from the next-to-next frame sync onwards using the first delayed source switch indication 218 thereby generating output frame sync 217A-1, . . . N (hereinafter collectively referred to as output frame sync 217A) of the video sources 106 including the masked frame sync of the first video source and the input frame sync 216A of the video sources 106 excluding the first video source. The line sync determination unit 230 receives line sync 216B-1, . . . N (hereinafter collectively referred to as line sync 216B) of the video sources 106 and determines a line sync of the first video source from the among the received input line sync 216B of the video sources 106 using the current source ID 212. The line sync mask unit 232 blocks the line sync of the first video source starting from the next-to-next frame sync onwards using the first delayed source switch indication 218 thereby generating output line sync 217B-1, . . . N (hereinafter collectively referred to as output line sync 217B) of the video sources 106 including the masked line sync of the first video source and the input line sync 216B of the video sources 106 excluding the first video source. Upon masking the frame sync and the line sync of the first video source, the switching unit 120 generates the output interface signals 122 for driving the display device 104 to switch from rendering the video stream of the first video source to the video stream of the second video source. The switching unit 120 is further explained in detail in conjunction with FIG. 2E.

Figure 2E:
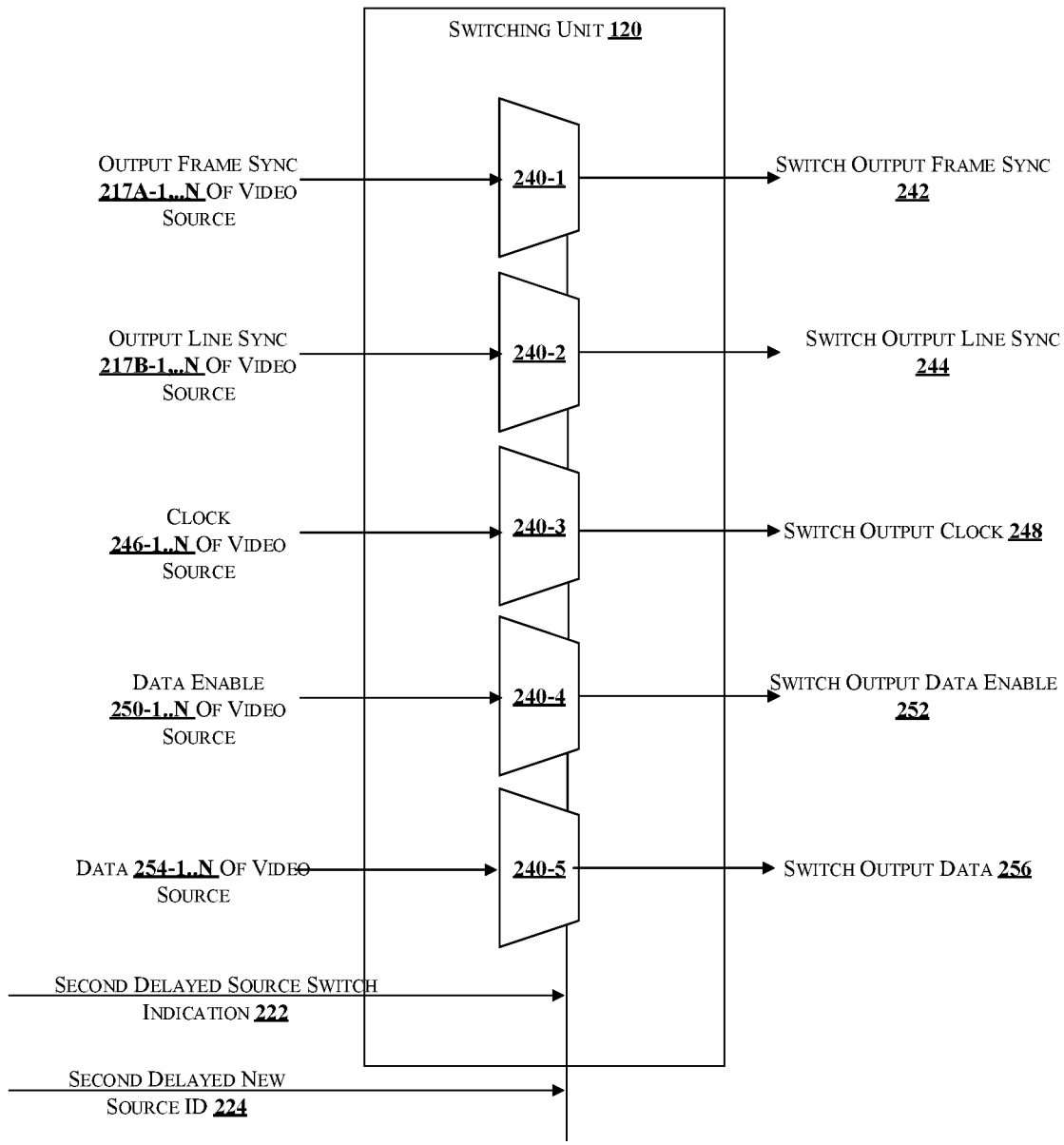
FIG. 2E illustrate an exemplary block diagram of switching unit of the VSPS of FIG. 1 in accordance with some embodiments of the present disclosure.

As illustrated in FIG. 2E, the switching unit 120 includes one or more multiplexers 240-1, . . . N, each capable of selecting at least one output interface signal from the input interface signals 112 to drive the display device 104 based on the second delayed source switch indication 222 and the second delayed new source ID 224 received from the MSMU 118. In an aspect, the switching unit 120 includes at least a first multiplexer 240-1, a second multiplexer 240-2, a third multiplexer 240-3, a fourth multiplexer 240-4, and a fifth multiplexer 240-5, each configured to select a switch output signal from among plurality of input interface signals 112 provided by the MSMU 118 and the video sources 106.

The first multiplexer 240-1 receives the output frame sync 217A of the video sources 106 from the MSMU 118 and generates a switch output frame sync 242 using the second delayed source switch indication 222 and the second delayed new source ID 224. In one embodiment, the first multiplexer 240-1 selects the frame sync of the second video source from among the received output frame sync 217A of the video sources 106 as the switch output frame sync 242, so as to switch the display device 104 from a frame sync of the first video source to the frame sync of the second video source.

The second multiplexer 240-2 receives the output line sync 217B of the video sources 106 from the MSMU 118 and generates a switch output line sync 244 using the second delayed source switch indication 222 and the second delayed new source ID 224. In one embodiment, the second multiplexer 240-2 selects the output line sync of the second video source from among the received output line sync 217B of the video sources 106 as the switch output line sync 244, so as to switch the display device 104 from a line sync of the first video source to the line sync of the second video source.

Further, the third multiplexer 240-3 receives clock 246-1, . . . N of the video sources 106 and generates a switch output clock 248 by switching from a clock of the first video source to a clock of the second video source using the second delayed source switch indication 222 and the second delayed new source ID 224. The fourth multiplexer 240-4 receives data enable 250-1, . . . N of the video sources 106 and generates a switch output data enable 252 by switching from data enable of the first video source to data enable of the second video source using the second delayed source switch indication 222 and the second delayed new source ID 224. The fifth multiplexer 240-5 receives data 254-1, . . . N of the video sources 106 and generates a switch output data 256 by switching from data of the first video source to data of the second video source using the second delayed source switch indication 222 and the second delayed new source ID 224. The switching unit 120, thereby generates the output interface signals 122 including the switch output frame sync 242, the switch output line sync 244, the switch output clock 248, the switch output data enable 252 and the switch output data 256 and transmits the output interface signals 122 to the display device 104.

The switching unit 120 is further configured to transmit the output interface signals 122 to the display device 104 for rendering/viewing the video stream of the second video source. In another aspect, the switching unit 120 is configured to store the output interface signals 122 in a storage device (not shown) for future references and further configured to transmit to a network device (not shown) for further processing. Thus, the present disclosure enables seamless switching of the display device 104 from a first video source to a second video source without using frame buffer, thereby rendering the video stream from multiple video sources without any tearing artifacts or display glitches and still optimizing the switching latency.

Figure 3:
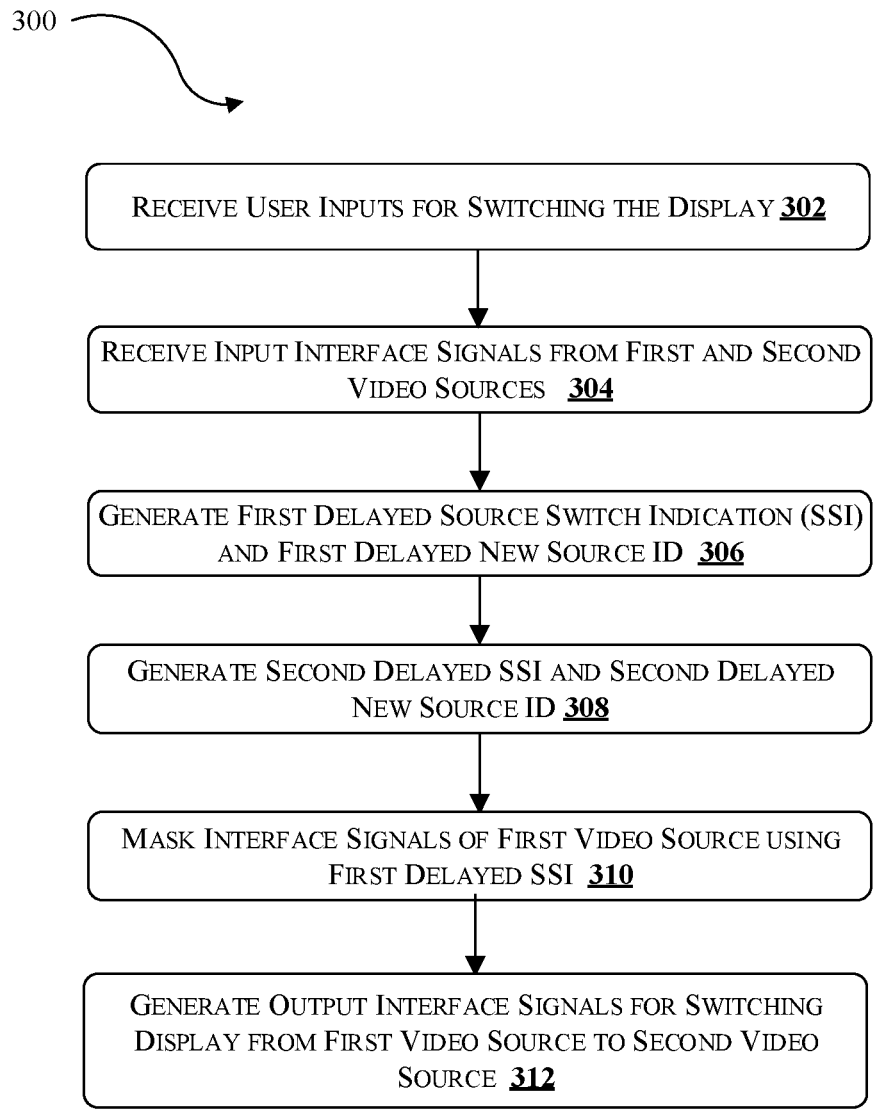
FIG. 3 illustrates an exemplary flowchart for method of switching display from first video source to second video source in accordance with some embodiments of the present disclosure.

FIG. 3 illustrates a flowchart of an exemplary method of switching display from a first video source to a second video source in accordance with some embodiments of the present disclosure.

As illustrated in FIG. 3, the method 300 includes one or more blocks implemented by the processor 114 of the VSPS 102 for switching display 104 from the first video source to the second video source. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the scope of the subject matter described herein. Furthermore, the method 300 can be implemented in any suitable hardware, software, firmware, or combination thereof.

At block 302, the method includes receiving, by the VSPS 102, the user inputs 108 for switching the display device 104 from the first video source to the second video source. The user inputs 108, may be for example include at least the source switch indication (SSI) 213 and the new source ID 214. The source switch indication 213 includes a user request for switching the display device 104 to the video sources 106 identified by the new source ID 214.

At block 304, receiving, by the VSPS 102, the one or more input interface signals 112 from the video sources 106 including the first and second video sources. The one or more input interface signals 112 may include at least one of Vsync or frame sync, Hsync or line sync, clock, data enable, and data associated with the video sources 106 that may be capable of driving the display device 104.

At block 306, generating, by the first delay unit 202 of the MSMU 118, the first delayed source switch indication 218 and first delayed new source ID 220. In one embodiment, the current frame sync unit 215 of the first delay unit 202 receives the input frame sync 216A of the video sources 106 that includes at least frame sync of the first video source and determines a next frame sync of the first video source using the current source ID 212 retrieved from the first source ID register 208. Upon determination, the current frame sync unit 215 delays the source switch indication 213 and the new source ID 214 till start of the next frame sync of the first video source, thereby generating the first synchronized signal, including at least the first delayed source switch indication 218 and the first delayed new source ID 220. The first synchronized signal may be a frame level adaptive synchronized signal, in one embodiment. To create window for dynamic switching without any visual disturbance or tearing artifacts, the first synchronized signal is further synchronized to generate a second synchronized signal that includes at least a second delayed source switch indication 222 and a second delayed new source ID 224.

At block 308, generating, by the second delay unit 204 of the MSMU 118, the second delayed source switch indication 222 and second delayed new source ID 224. In one embodiment, the current and new frame sync unit 226 of the second delay unit 204 determines a next-to-next frame sync using the current source ID 212 retrieved from the first source ID register 208. Further, the current and new frame sync unit 226 determines a next frame sync of the second video source using the new source ID 214. Upon determination, the current and new frame sync unit 226 delays the first delayed source switch indication 218 and the first delayed new source ID 220 till start of the next frame sync of the second video source occurring either at or after the next-to-next frame sync of the first video source, thereby generating the second synchronized signal, including at least the second delayed source switch indication 222 and the second delayed new source ID 224. The second synchronized signal may be a frame level adaptive synchronized signal, in one embodiment. Upon synchronization, the sync mask unit 206 blocks the input interface signals of the first video source using the first delayed source switch indication 218.

At block 310, masking, by the sync mask unit 206 of the MSMU 118, interface signals of the first video source using the first delayed source switch indication 218. In one embodiment, the frame sync determination unit 227 of the sync mask unit 206 receives the input frame sync 216A of the video sources 106 and determines the next-to-next frame sync of the first video source among the received input frame sync 216A of the video sources 106 using the current source ID 212. The frame sync mask unit 228 blocks the frame sync of the first video source starting from the next-to-next frame sync onwards using the first delayed source switch indication 218 thereby generating the output frame sync 217A of the video sources 106 including the masked frame sync of the first video source and the input frame sync 216A of the video sources 106 excluding the first video source.

The line sync determination unit 230 of the sync mask unit 206 receives the input line sync 216B of the video sources 106 and determines a line sync of the first video source from among the received line sync 216B of the video sources 106 using the current source ID 212. The line sync mask unit 232 blocks the line sync of the first video source starting from the next-to-next frame sync onwards using the first delayed source switch indication 218 thereby generating output line sync 217B of the video sources 106 including the masked line sync of the first video source and the input line sync 216B of the video sources 106 excluding the first video source. Upon masking the frame sync and line sync of the first video source, the switching unit 120 generates the output interface signals 122 for driving the display device 104 to switch from rendering the video stream of the first video source to the video stream of the second video source.

At block 312, generating, by the switching unit 120, the output interface signals 122 for switching the display 104 from the first video source to the second video source. In an aspect, the switching unit 120 includes at least a first multiplexer 240-1, a second multiplexer 240-2, a third multiplexer 240-3, a fourth multiplexer 240-4, and a fifth multiplexer 240-5, each configured to select a switch output signal from the input interface signals 112 provided by the MSMU 118 and the video sources 106.

The first multiplexer 240-1 receives the output frame sync 217A of the video sources 106 from the MSMU 118 and generates a switch output frame sync 242 using the second delayed source switch indication 222 and the second delayed new source ID 224. In one embodiment, the first multiplexer 240-1 selects the frame sync of the second video source from among the received output frame sync 217A of the video sources 106 as the switch output frame sync 242, so as to switch the display device 104 from a frame sync of the first video source to the frame sync of the second video source.

The second multiplexer 240-2 receives the output line sync 217B of the video sources 106 from the MSMU 118 and generates a switch output line sync 244 using the second delayed source switch indication 222 and the second delayed new source ID 224. In one embodiment, the second multiplexer 240-2 selects the output line sync of the second video source from among the received output line sync 217B of the video sources 106 as the switch output line sync 244, so as to switch the display device 104 from a line sync of the first video source to the line sync of the second video source.

Further, the third multiplexer 240-3 receives clock 246-1, . . . N of the video sources 106 and generates a switch output clock 248 by switching from a clock of the first video source to a clock of the second video source using the second delayed source switch indication 222 and the second delayed new source ID 224. The fourth multiplexer 240-4 receives data enable 250-1, . . . N of the video sources 106 and generates a switch output data enable 252 by switching from data enable of the first video source to data enable of the second video source using the second delayed source switch indication 222 and the second delayed new source ID 224. The fifth multiplexer 240-5 receives data 254-1, . . . N of the video sources 106 and generates a switch output data 256 by switching from data of the first video source to data of the second video source using the second delayed source switch indication 222 and the second delayed new source ID 224. The switching unit 120, thereby generates the output interface signals 122 including the switch output frame sync 242, the switch output line sync 244, the switch output clock 248, the switch output data enable 252 and the output data 256 and transmits the output interface signals 122 to the display device 104.

The switching unit 120 is further configured to transmit the output interface signals 122 to the display device 104 for rendering/viewing the video stream of the second video source. In another aspect, the switching unit 120 is configured to store the output interface signals 122 in a storage device (not shown) for future references and further configured to transmit to a network device (not shown) for further processing. Thus, the present disclosure enables seamless switching of the display device 104 from a first video source to a second video source without using frame buffer, thereby rendering the video stream from multiple video sources without any tearing artifacts or display glitches and still optimizing the switching latency.

Advantages of the embodiment of the present disclosure include seamless switching of the display from a first video source to a second video source without using frame buffer. In another embodiment, the present disclosure enables rendering of the video stream from multiple video sources without any tearing artifacts or display glitches and still optimizing the switching latency.

It is intended that the disclosure and examples be considered as exemplary only, with a true scope and spirit of disclosed embodiments being indicated by the following claims.

What is claimed is:

1. A method of switching display from a first video source to a second video source, the method comprising:
    receiving, by a multilayer synchronization and mask unit (MSMU) of a video switching processing system (VSPS), one or more interface signals as input from a plurality of video sources that comprises at least the first video source and the second video source, wherein the one or more interface signals comprise at least one of frame sync, line sync, clock, data enable and data;
    receiving, by the MSMU, one or more user inputs comprising at least a source switch indication and new source identification (ID) associated with the second video source, wherein the source switch indication comprises a request for switching the display from the first video source to the second video source;
    synchronizing, by the MSMU, the source switch indication and the new source ID with frame sync of the first video source to generate a first delayed source switch indication and first delayed new source ID;
    synchronizing, by the MSMU, the first delayed source switch indication and the first delayed new source ID with frame sync of the second video source to generate a second delayed source switch indication and second delayed new source ID;
    masking, by the MSMU, the one or more interface signals of the first video source using the first delayed source switch indication; and
    generating, by a switching unit of the VSPS, one or more output interface signals for switching the display from the first video source to the second video source based on the second delayed source switch indication and the second delayed new source ID.

2. The method as claimed in claim 1, wherein synchronizing the source switch indication and the new source ID with the frame sync of the first video source, comprises:
    determining next frame sync of the first video source using a current source ID, wherein the current source ID identifies the first video source from the plurality of video sources;
    delaying the source switch indication and the new source ID till start of the next frame sync of the first video source; and
    generating the first delayed source switch indication and the first delayed new source ID upon the delaying.

3. The method as claimed in claim 1, wherein synchronizing the first delayed source switch indication and the first delayed new source ID with the frame sync of the second video source comprises:
    determining next-to-next frame sync of the first video source using a current source ID;
    determining next frame sync of the second video source using the new source ID, wherein the new source ID identifies the second video source from the plurality of video sources;
    delaying the first delayed source switch indication and the first delayed new source ID till start of the next frame sync of the second video source occurring either at or after the next-to-next frame sync of the first video source; and
    generating the second delayed source switch indication and the second delayed new source ID upon the delaying.

4. The method as claimed in claim 3, wherein the masking comprises steps of:
    determining the next-to-next frame sync of the first video source from input frame sync of the plurality of video sources using the current source ID;
    blocking the frame sync of the first video source starting from the next-to-next frame sync onwards using the first delayed source switch indication to generate an output frame sync of the plurality of video sources;
    determining a line sync of the first video source from input line sync of the plurality of video sources using the current source ID; and
    blocking the line sync of the first video source starting from the next-to-next frame sync of the first video source using the first delayed source switch indication to generate an output line sync of the plurality of video sources.

5. The method as claimed in claim 1, wherein generating the one or more output interface signals for switching the display from the first video source to the second video source, comprises:
    generating a switch output frame sync of the display by switching from a frame sync of the first video source to a frame sync of the second video source using the second delayed source switch indication and the second delayed new source ID;
    generating a switch output line sync by switching from a line sync of the first video source to a line sync of the second video source using the second delayed source switch indication and the second delayed new source ID;
    generating a switch output clock by switching from a clock of the first video source to a clock of the second video source using the second delayed source switch indication and the second delayed new source ID; and
    generating switch output data enable and switch output data by switching from data enable and data of the first video source to data enable and data of the second video source using the second delayed source switch indication and the second delayed new source ID.

6. The method as claimed in claim 1, further comprising, driving the one or more output interface signals to the display for viewing video stream signals of the second video source, to a storage device for storing and to a network device for further transmission.

7. A video switching processing system for switching display from a first video source to a second video source, system comprising:
    a multilayer synchronization and mask unit (MSMU) and a switching unit coupled with the MSMU, wherein the MSMU is configured to receive one or more interface signals from the first video source and the second video source, wherein one or more interface signals include at least one of frame sync, line sync, clock, data enable and data, wherein the MSMU comprises at least:
a first delay unit, a second delay unit, and a sync mask unit coupled with the first delay unit and the second delay unit;
wherein the first delay unit is configured to:
receive input frame sync of plurality of video sources that comprises at least the first video source and the second video source;
receive one or more user inputs comprising at least a source switch indication and new source identification (ID) associated with the second video source, wherein the source switch indication comprises a request for switching the display from the first video source to the second video source; and
synchronize the source switch indication and the new source ID with frame sync of the first video source to generate a first delayed source switch indication and first delayed new source ID;
wherein the second delay unit is configured to synchronize the first delayed source switch indication and the first delayed new source ID with frame sync of the second video source to generate a second delayed source switch indication and second delayed new source ID;
wherein the sync mask unit is configured to mask the one or more interface signals of the first video source using the first delayed source switch indication; and
wherein the switching unit is configured to generate one or more output interface signals for switching the display from the first video source to the second video source based on the second delayed source switch indication and the second delayed new source ID.

8. The system as claimed in claim 7, wherein the first delay unit is configured to synchronize the source switch indication and the new source ID with the frame sync of the first video source, by being configured to:
determine a next frame sync of the first video source using a current source ID, wherein the current source ID identifies the first video source from the plurality of video sources and is stored in a first source ID register coupled with the first delay unit;
delay the source switch indication and the new source ID till start of the next frame sync of the first video source; and
generate the first delayed source switch indication and the first delayed new source ID upon the delaying.

9. The system as claimed in claim 7, wherein the second delay unit is configured to synchronize the first delayed source switch indication and the first delayed new source ID with the frame sync of the second video source, by being configured to:
determine next-to-next frame sync of the first video source using a current source ID;
determine next frame sync of the second video source using the new source ID, wherein the new source ID identifies the second video source from the plurality of video sources and is stored in a second source ID register coupled with the second delay unit;
delay the first delayed source switch indication and the first delayed new source ID till start of the next frame sync of the second video source occurring either at or after the next-to-next frame sync of the first video source; and
generate the second delayed source switch indication and the second delayed new source ID upon the delaying.

10. The system as claimed in claim 9, wherein the sync mask unit is configured to:
determining the next-to-next frame sync of the first video source from the input frame sync of the plurality of video sources using the current source ID;
blocking the frame sync of the first video source starting from the next-to-next frame sync onwards using the first delayed source switch indication to generate an output frame sync of the plurality of video sources;
determining a line sync of the first video source from input line sync of the plurality of video sources using the current source ID; and
blocking the line sync of the first video source starting from the next-to-next frame sync of the first video source using the first delayed source switch indication to generate an output line sync of the plurality of video sources.

11. The system as claimed in claim 7, wherein the switching unit comprises:
at least a first multiplexer, configured to generate a switch output frame sync of the display by switching from a frame sync of the first video source to a frame sync of the second video source using the second delayed source switch indication and the second delayed new source ID;
at least a second multiplexer, configured to generate a switch output line sync by switching from a line sync of the first video source to a line sync of the second video source using the second delayed source switch indication and the second delayed new source ID;
at least a third multiplexer, configured to generate a switch output clock by switching from a clock of the first video source to a clock of the second video source using the second delayed source switch indication and the second delayed new source ID; and
at least a fourth multiplexer and at least a fifth multiplexer, respectively configured to generate switch output data enable and switch output data by switching from data enable and data of the first video source to data enable and data of the second video source using the second delayed source switch indication and the second delayed new source ID.

12. The system as claimed in claim 7, wherein the switching unit is further configured to drive the one or more output interface signals to the display for viewing video stream of the second video source, to a storage device for storing and to a network device for further transmission.

* * * * *